United States Patent
Oroskar et al.

(10) Patent No.: US 10,314,057 B1
(45) Date of Patent: Jun. 4, 2019

(54) MANAGING ALLOCATION OF RESOURCES TO A RELAY-UE BASED ON A DETERMINATION THAT THE RELAY-UE IS POSITIONED WITHIN AN INDOOR ENVIRONMENT

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 193 days.

(21) Appl. No.: 15/296,352

(22) Filed: Oct. 18, 2016

(51) Int. Cl.
  *H04W 72/12* (2009.01)
  *H04W 4/04* (2009.01)
  *H04W 88/04* (2009.01)

(52) U.S. Cl.
  CPC ....... *H04W 72/1205* (2013.01); *H04W 4/043* (2013.01); *H04W 88/04* (2013.01)

(58) Field of Classification Search
  CPC ................................. H04W 72/1205
  USPC ........................................ 370/315
  See application file for complete search history.

(56) References Cited

U.S. PATENT DOCUMENTS

| 9,584,966 B1* | 2/2017 | Thiel ........................ H04W 4/02 |
| 2012/0184204 A1 | 7/2012 | Kazmi et al. |
| 2012/0294161 A1* | 11/2012 | Sunay ............... H04W 72/1236 370/252 |
| 2013/0237245 A1* | 9/2013 | Tinnakornsrisuphap .................... H04W 64/00 455/456.1 |
| 2016/0003949 A1 | 1/2016 | Venkataraman et al. |

FOREIGN PATENT DOCUMENTS

WO    2016/059063 A1    4/2016

* cited by examiner

*Primary Examiner* — Shripal K Khajuria (57) ABSTRACT

Disclosed are methods and systems for managing allocation of air interface resources to a relay user equipment device (relay-UE) that provides wireless backhaul connectivity for a relay base station (relay-BS). In particular, a base station may serve the relay-UE and may make a determination that the relay-UE is positioned within an indoor environment rather than within an outdoor environment. While serving the relay-UE, the base station may manage allocation of air interface resources to the relay-UE and may do so based at least on the determination that the relay-UE is positioned within an indoor environment rather than within an outdoor environment.

20 Claims, 6 Drawing Sheets

MANAGING ALLOCATION OF RESOURCES TO A RELAY-UE BASED ON A DETERMINATION THAT THE RELAY-UE IS POSITIONED WITHIN AN INDOOR ENVIRONMENT

BACKGROUND

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol (radio access technology), with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of UEs, initiation of communications, handover between coverage areas, and other functions related to air interface communication.

In accordance with a recent version of the LTE standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz, with each carrier being divided primarily into subcarriers spaced apart from each other by 15 kHz. Further, the air interface is divided over time into a continuum of 10-millisecond frames, with each frame being further divided into ten 1-millisecond subframes or transmission time intervals (TTIs) that are in turn each divided into two 0.5-millisecond segments. In each 0.5 millisecond segment or in each 1 millisecond TTI, the air interface is then considered to define a number of 12-subcarrier wide "resource blocks" spanning the frequency bandwidth (i.e., as many as would fit in the given frequency bandwidth). In addition, each resource block is divided over time into symbol segments of 67 µs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the base station to UEs, and other resource elements are reserved to define a physical downlink shared channel (PDSCH) for carrying bearer data transmissions from the base station to UEs. Likewise, on the uplink, certain resource elements across the bandwidth are reserved to define a physical uplink control channel (PUCCH) for carrying control signaling from UEs to the base station, and other resource elements are reserved to define a physical uplink shared channel (PUSCH) for carrying bearer data transmissions from UEs to the base station.

In a system arranged as described above, when a UE enters into coverage of a base station, the UE may engage in attach signaling with the base station, by which the UE would register to be served by the base station on a particular carrier. Through the attach process and/or subsequently, the base station and supporting LTE network infrastructure may establish for the UE one or more bearers, essentially defining logical tunnels for carrying bearer data between the UE and a transport network such as the Internet.

Once attached with the base station, a UE may then operate in a "connected" mode in which the base station may schedule data communication to and from the UE on the UE's established bearer(s). In particular, when a UE has data to transmit to the base station, the UE may transmit a scheduling request to the base station, and the base station may responsively allocate one or more upcoming resource blocks on the PUSCH to carry that bearer traffic and transmit on the PDCCH to the UE a downlink control information (DCI) message that directs the UE to transmit the bearer traffic in the allocated resource blocks, and the UE may then do so. Likewise, when the base station has bearer traffic to transmit to the UE, the base station may allocate PDSCH resource blocks to carry that bearer traffic and may transmit on the PDCCH to the UE a DCI message that directs the UE to receive the bearer traffic in the allocated resource blocks, and the base station may thus transmit the bearer traffic in the allocated resource blocks to the UE. LTE also supports uplink control signaling on the PUCCH using uplink control information (UCI) messages. UCI messages can carry scheduling requests from UEs, requesting the base station to allocate PUSCH resource blocks for uplink bearer data communication.

With these arrangements, base stations of a wireless service provider's network would ideally provide seamless coverage throughout a market area, so that UEs being served by the system could move from coverage area to coverage area without losing connectivity. In practice, however, it may not be possible to operate a sufficient number of base stations or to position the base stations in locations necessary to provide seamless coverage. As a result, there may be holes in coverage.

One way to help to resolve this problem is to operate a relay node (RN) that effectively extends the range of a base station's coverage area so as to partially or completely fill a coverage hole. Such an RN may be configured with a wireless backhaul interface for communicating with and being served by the base station, referred to as a "donor base station," and may also be configured with a wireless access interface for communicating with and serving one or more end-user UEs, such as a cell phone, wirelessly equipped computer, tablet, and/or other device that is not set to provide wireless backhaul connectivity. For example, the RN could include a relay base station (relay-BS) that serves end-user UEs and could also include a relay-UE that is served by the donor base station and thus provides wireless backhaul connectivity for the relay-BS. In practice, the relay-BS and relay-UE could be integrated together as a single RN device or could be provided as separate devices communicatively linked together. Moreover, the relay-UE may be "user" operated or may not be "user" operated.

In this arrangement, the base station is considered to be a donor base station, in that the base station provides coverage to the relay-UE, and the relay-BS then provides coverage to one or more end-user UEs. Also, the wireless communication link between the donor base station and the relay-UE is considered to be a "relay backhaul link," and the wireless communication link between the relay-BS and UEs served by the relay-BS is considered to be a "relay access link." Further, to the extent the donor base station itself also serves end-user UEs, the wireless communication link between the donor base station and those UEs is considered to be a "donor access link."

Overview

Generally, relay-UEs can be deployed in various environments and for various reasons. For example, a relay-UE may be positioned within an outdoor environment, such as in any area outside of a building. In this example, the relay-UE may be connected or integrated as part of an RN that is arranged to help fill a coverage hole within that outdoor environment. In another example, a relay-UE may be positioned within an indoor environment, such as inside of a building. In this example, the relay-UE may be connected or integrated as part of an RN that is arranged to help fill a coverage hole within that indoor environment.

Assuming all other factors are the same, a relay-UE positioned within an indoor environment may often receive weaker coverage than a relay-UE positioned within an outdoor environment. By way of example, assuming that the indoor relay-UE receives coverage from a serving donor base station that is positioned outdoors, transmissions between the indoor relay-UE and the outdoor donor base station are likely to propagate through walls of a building. On the other hand, assuming that the outdoor relay-UE also receives coverage from the serving donor base station that is positioned outdoors, transmissions between the outdoor relay-UE and the outdoor donor base station may not necessarily propagate through walls of a building. And because transmissions that propagate through walls are generally received with lower signal strength compared to received signal strength of transmissions that do not propagate through walls, the indoor relay-UE may receive weaker coverage from the outdoor donor base station than the outdoor relay-UE would receive.

In practice, when an indoor relay-UE experiences weaker coverage, the indoor relay-UE may encounter issues with communications over the wireless backhaul connection between the indoor relay-UE and its serving donor base station. For example, the relay-UE may encounter a loss of connectivity over the wireless backhaul connection and thus may not be able to transmit and/or receive data over the wireless backhaul connection. In another example, the relay-UE may encounter a dropping of data packets to be transmitted over the wireless backhaul connection. Other examples are also possible.

Moreover, when the indoor relay-UE encounters issues with communications over the wireless backhaul connection, end-user UEs may as a result also experience various issues. In particular, as noted, the relay-UE provides wireless backhaul connectivity for a relay-BS that serves one or more end-user UEs. Thus, when an indoor relay-UE encounters issues with communications over the wireless backhaul connection, the end-user UEs connected through that indoor relay-UE may no longer be able to properly engage in communications with the wireless communication system via the indoor relay-UE. Consequently, such end-user UEs may experience dropped calls and/or a reduced quality of service, among other issues.

Disclosed herein are methods and systems to help minimize problems resulting from a relay-UE being positioned within an indoor environment. In accordance with the disclosure, a base station serving a relay-UE may make a determination that the relay-UE is positioned within an indoor environment. Based on that determination, the base station may manage allocation of air interface resources to the relay-UE. For instance, the base station may increase the extent of air interface resources with which the base station serves the relay-UE. In this way, the base station may proactively help to compensate for issues that could arise as a result of the relay-UE being positioned within an indoor environment.

Accordingly, in one respect, disclosed is a method. In accordance with the method, a base station may serve a relay-UE that provides wireless backhaul connectivity for a relay-BS. Also, the base station may make a determination that the relay-UE is positioned within an indoor environment. While serving the relay-UE, the base station may then manage allocation of air interface resources to the relay-UE, with the allocation of air interface resources being based at least on the determination that the relay-UE is positioned within an indoor environment.

In another respect, disclosed is a base station. The base station may include (i) an antenna structure configured to provide an air interface through which the base station serves one or more UEs and (ii) a controller configured to carry out operations. The operations may include serving a UE (e.g., a relay-UE or an end-user UE) over the air interface. And the operations may include making a determination that the UE is positioned within an indoor environment. Further, the operations may include, while serving the UE, managing allocation of air interface resources to the UE, with the allocation of air interface resources being based at least on the determination that the UE is positioned within an indoor environment.

In yet another respect, disclosed is another method. In accordance with the method, a base station may serve a relay-UE that provides wireless backhaul connectivity for a relay-BS. Also, the base station may make a determination of whether the relay-UE is positioned within an outdoor environment or whether the relay-UE is positioned within an indoor environment. If the determination is that the relay-UE is positioned within an outdoor environment, then, responsive to making the determination, the base station may serve the relay-UE using a first extent of air interface resources. And if the determination is that the relay-UE is positioned within an indoor environment, then, responsive to making the determination, the base station may serve the relay-UE using a second extent of air interface resources that is greater than the first extent of air interface resources.

Still further, in yet another respect, disclosed is a non-transitory computer-readable medium having stored thereon instructions executable by a processor to manage allocation of air interface resources to a relay-UE based at least one a determination that the relay-UE is positioned within an indoor environment.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Referring to the drawings, as noted above, FIG. 1 is a simplified block diagram of an example communication system in which the present method can be implemented. The illustrated communication system includes a representative base station 12 that is interconnected with network infrastructure 14, such as a switch and/or gateway, providing connectivity with one or more transport networks 16 such as the PSTN and/or the Internet. The base station 12 may be configured to serve one or more RNs and could thus be referred to as a donor base station once the base station begins to serve one or more such RNs.

Figure 1:
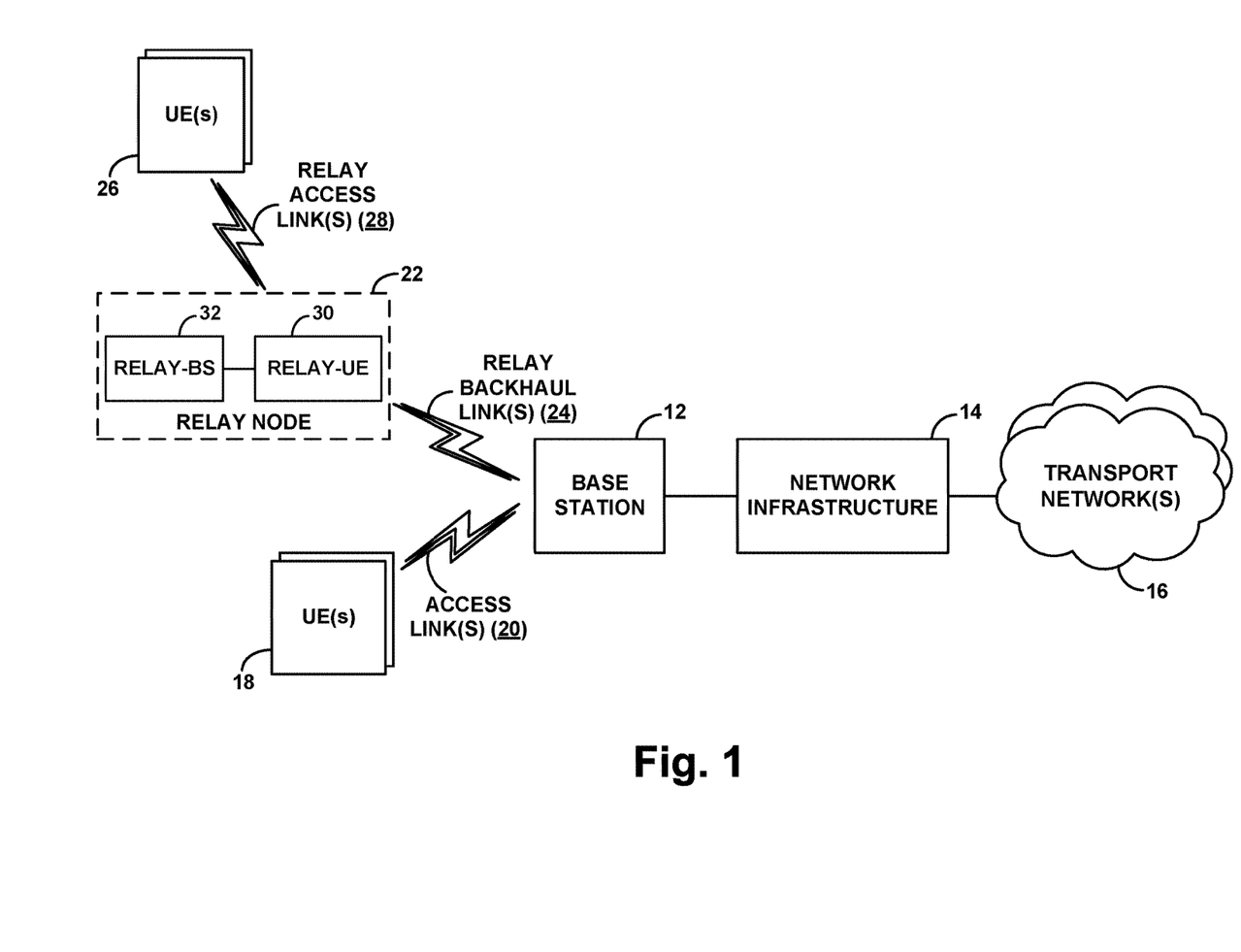
FIG. 1 is a simplified block diagram of a wireless communication system in which the present method can be implemented.

FIG. 1 illustrates that the base station 12 may serve one or more end-user UEs 18 respectively over one or more access links 20 and may also serve an RN 22 over one or more relay backhaul links 24. Further, FIG. 1 illustrates that the RN 22 may then itself serve one or more end-user UEs 26 respectively over one or more relay access links 28. Moreover, the RN 22 is shown as including a relay-UE 30 and a relay-BS 32. In practice, the relay-UE 30 may be served by the donor base station 12 and may thus provide wireless backhaul connectivity for the relay-BS 32 via the one or more relay backhaul links 24. And the relay-BS 32 could then serve one or more end-user UEs 26 via one or more relay access links 28. In this arrangement, as noted, the relay-UE 30 and relay-BS 32 could be integrated together as a single relay device or could be provided as separate devices communicatively linked together (e.g., via a local area network or other connection).

Through this communication system, each of the one or more UEs 18 may thus engage in communication on the transport network(s) 16 via at least one of the access links 20, the base station 12, and the network infrastructure 14. Also, each of the one or more UEs 26 may engage in communication on the transport network(s) 16 via at least one of the relay access links 28, the RN 22, at least one of the relay backhaul links 24, the base station 12, and the network infrastructure 14. Moreover, the base station 12 (and/or the RN 22) may be licensed or otherwise arranged to engage in wireless communications using one or more carriers each defining a particular frequency or range of frequencies. Other arrangements are possible as well.

Figure 2:
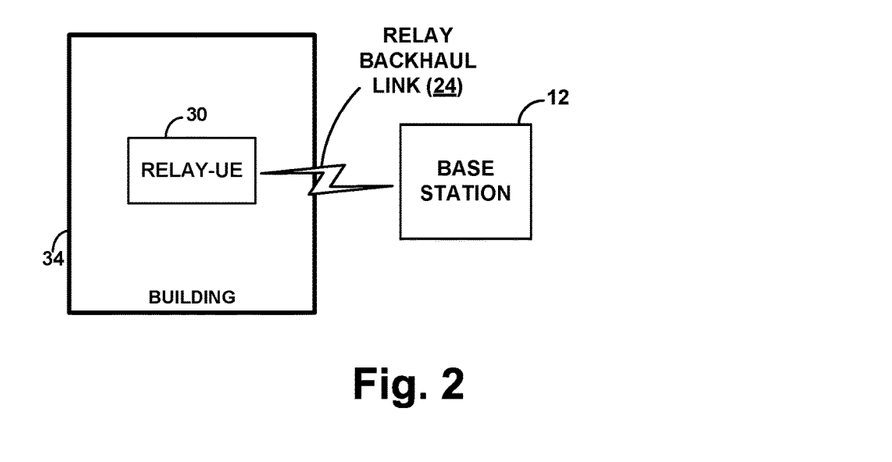
FIG. 2 is a simplified block diagram depicting a relay-UE positioned inside of a building in accordance with the present disclosure.
Figure 3:
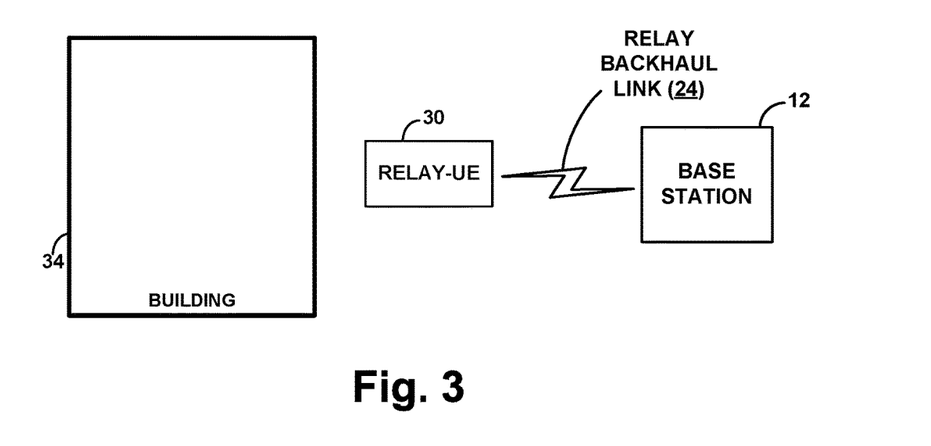
FIG. 3 is a simplified block diagram depicting a relay-UE positioned outside of a building in accordance with the present disclosure.

In line with the discussion above, FIGS. 2 and 3 next illustrate that a relay-UE can be deployed within an indoor environment or within an outdoor environment. In particular, FIG. 2 is a simplified block diagram depicting that the relay-UE 30 may be positioned inside of a representative building 34 and thus that transmission over the relay backhaul link 24 may propagate through a wall of the building 34. Further, FIG. 3 is a simplified block diagram depicting that the relay-UE 30 may alternatively be positioned outside of the building 34 and thus that transmission over the relay backhaul link 24 may not necessarily propagate through walls. Other illustrations are also possible.

When the base station 12 serves a UE, such as the relay-UE 30, the base station 12 may do so over a radio resource control (RRC) connection defining a radio-link-layer connection between the UE and the base station 12. In this regard, we may assume by way of example (and without limitation) that the UE (e.g., the relay-UE 30) is attached with based station 12 and is thus being served with wireless communication service by base station 12. As such, we may assume that the UE has worked with base station 12 to establish an RRC connection defining a respective radio-link-layer connection between the UE and the base station 12, and that at least one logical bearer has been established between the UE and a gateway system (not shown) of the network infrastructure 14, with the bearer including a radio portion extending between the UE and the base station 12 and an access-network portion extending between the base station 12 and the gateway system. Furthermore, we may also assume that the established RRC connection encompasses at least one carrier. In this way, the base station 12 may schedule use of resources on the carrier(s) to transmit data between the base station 12 and the UE.

Once a UE is so attached, the base station 12 could then serve the UE with data communications over the air interface. In accordance with LTE, for example, data is modulated into symbols using a data modulation and coding scheme (MCS) and symbols are then modulated onto the air interface using an air interface modulation scheme. In this regard, the base station 12 could select an MCS based on the UE's reported channel quality so as to have each symbol represent more or fewer bits of data depending on the UE's channel quality.

In particular, a UE may from time to time determine its channel quality based at least on downlink air interface quality (e.g., downlink reference signal strength) and may transmit to the base station 12 a channel quality indicator (CQI) indicating the UE's determined channel quality. Using a standard CQI-MCS mapping table that maps CQI to MCS, the base station 12 may then determine from the reported CQI what MCS to use for communication with the UE. Alternatively or additionally, the base station 12 may from time to time evaluate uplink air interface quality (e.g., uplink reference signal strength) as a basis to determine the UE's channel quality, and the base station 12 may similarly select an appropriate MCS for air interface communication with the UE.

With this arrangement, as the data for the UE arrives at the base station 12, the base station 12 may schedule and provide transmission of the data to the UE. In particular, the base station 12 could determine an appropriate MCS based on the UE's reported channel quality, and the base station 12 could thereby determine how many resource elements and thus how many downlink resource blocks would be required to transmit the data. The base station 12 could then assign certain downlink resource block(s) in a TTI to carry at least a portion of the data to the UE. And in that TTI, the base station 12 could transmit to the UE a DCI message specifying the MCS and assigned resource block(s) and could transmit the data accordingly in the specified resource block(s), using air interface modulation.

Likewise, as the UE has data to transmit on the network, the UE could transmit a scheduling request to the base station 12 in a particular TTI and could provide the base station 12 with a report of the quantity of data to be transmitted. The base station 12 could then similarly determine an appropriate MCS based on the UE's reported channel quality and determine how many resource elements and thus how many uplink resource blocks would be required to transmit the data. The base station could then assign certain uplink resource block(s) in an upcoming TTI to carry at least a portion of the data from the UE and could transmit to the UE a DCI specifying the MCS and assigned resource block(s) of the upcoming TTI. In that upcoming TTI, the UE could then transmit data accordingly in the specified resource block(s), using air interface modulation.

In a system arranged as described above, the air interface will have a particular limited extent of resources (resource units, such as resource blocks and resource elements) that the base station 12 can allocate per unit time, such as per TTI. In practice, the base station 12 may manage this allocation based on various factors such as the extent of data to be communicated, the UE's air interface channel quality, the load on the air interface, and so forth.

Moreover, since the base station 12 has a limited amount of resources to assign, the base station 12 may prioritize allocation of these resources. In particular, the base station 12 may assign, respectively to each UE using resources from base station 12, a scheduling priority level for resource assignment from base station 12. In some cases, the base station 12 may assign each UE the same scheduling priority level for resource assignment from base station 12. In other cases, the base station 12 may assign some UEs higher or lower scheduling priority levels for resource assignment from base station 12 than other UEs. In either case, the act of assigning scheduling priority levels for resource assignment from base station 12 to UE(s) may take various forms.

By way of example, the act of giving a scheduling priority level may take the form of assigning a scheduling weight. In particular, a scheduling weight may define an extent to which the base station 12 should throttle or otherwise reduce output of data on the air interface to a UE in relation to the rate at which the base station 12 receives from the network infrastructure data that is destined to the UE. For instance, one scheduling weight may be 1:1, indicating no reduction in output rate, whereas another scheduling weight may be 1:2, indicating a reduction in output rate by a factor of one half. In a specific example, with the 1:1 scheduling weight, if the base station 12 receives a certain quantity of data per millisecond for transmission to the UE, the base station 12 would be set to transmit the data at that rate to the UE. On the other hand, with the 1:2 scheduling weight, if the base station 12 receives a certain quantity of data per millisecond for transmission to the UE, the base station would be set to transmit just half of that data to the UE per millisecond while buffering the rest. Other examples are also possible.

As noted, the present disclosure relates to an approach for managing allocation of air interface resources to a relay-UE based on whether the relay-UE is indoors or outdoors. Due to the various above-described issues that both a relay-UE and end-user UEs may respectively encounter as a result of the relay-UE being positioned indoors, the disclosed approach will be described herein the context of managing allocation of air interface resources to the relay-UE. But it is noted that the disclosed approach may also apply in the context of allocating air interface resources to an end-user UE based on whether the end-user UE is indoors or outdoors.

Moreover, although the disclosed approach could be carried out in various scenarios, for simplicity, the approach will be described here in a scenario where the base station 12 has already determined that the relay-UE 30 is operating as a relay-UE, and thus communicates with the relay-UE 30 accordingly, so that the relay-UE 30 could effectively serve as an intermediary entity that helps facilitate communications to and/or from end-user UE(s). In this regard, a mechanism may be provided to distinguish relay-UEs from end-user UEs.

By way of example, a relay-UE may have a special identifier or be served by the network under a special network identifier (e.g., a special public land mobile network (PLMN) identifier, or special packet data network (PDN) connection identifier), indicating that the relay-UE will be operating as a relay-UE. Whereas, a conventional end-user UE may have an identifier or be served by the network under an identifier that does not indicate the UE will be operating as a relay-UE and thus that may establish the UE is not a relay-UE. Thus, when a UE attaches with the network, such as with the base station 12, the network (e.g., the base station 12 and/or other network entity) may determine whether the UE is a relay-UE or not and do so based on such identification or other information provided by the UE during attachment or noted in a network profile record for the UE. Other examples are possible as well.

In accordance with the disclosed approach, the base station 12 may make a determination of whether the relay-UE 30 is positioned within an indoor environment (e.g., inside of a building) or whether the relay-UE 30 is positioned within an outdoor environment (e.g., any area outside of a building). And the base station 12 may then manage allocation of air interface resources to the relay-UE 30 based on that determination. Specifically, if the determination is that the relay-UE 30 is positioned within an outdoor environment, then, responsive to making the determination, the base station 12 may serve the relay-UE 30 with a first extent of air interface resources. And if the determination is that the relay-UE 30 is positioned within an indoor environment, then, responsive to making the determination, the base station 12 may serve the relay-UE 30 with a second extent of air interface resources that is greater than the first extent.

With this approach, assuming all other factors are the same, the base station 12 can ensure that a relay-UE receives more air interface resources if it is positioned indoors than it receives if it is positioned outdoors.

By way of example, the base station 12 may have a particular extent of data to transmit to an outdoor relay-UE and the base station 12 may encounter a particular load on the air interface between the base station 12 and the outdoor relay-UE. In this case, the base station 12 may allocate a first number of resource blocks for use to transmit the data to the outdoor relay-UE, specifically doing so based on the particular extent of data, the particular load, and a determination that the relay-UE is outdoors. On the other hand, the base station 12 may have the same particular extent of data to transmit to an indoor relay-UE and the base station 12 may encounter the same particular load on the air interface between the base station 12 and the indoor relay-UE. In this case, the base station 12 may allocate a second number of resource blocks for use to transmit the data to the indoor relay-UE, the second number of resource blocks being higher than the above-mentioned first number of resource blocks. Such allocation of the higher second number of resource blocks may be based on the particular extent of data, the particular load, and a determination that the relay-UE is indoors. Other examples are also possible More specifically, the base station 12 may make the above-mentioned determination in various ways. In accordance with the present disclosure, for instance, the base station 12 may receive from the relay-UE 30 a message indicative of whether the relay-UE 30 is positioned indoors or whether the relay-UE 30 is positioned outdoors, and the base station 12 may make the determination based on that received message. In practice, the base station 12 may receive that message during establishment of an RRC connection with the relay-UE 30, upon request, and/or from time-to-time, among other possibilities.

In one implementation, the relay-UE 30 can be provisioned with information indicating whether it is positioned indoors or outdoors, and thus the message may be based on that information. In practice, the relay-UE 30 can be provisioned with the information via a software configuration, such as via a manual programming of the relay-UE 30 to include that information. Additionally or alternatively, the relay-UE 30 can be provisioned with such information via a manual hardware configuration. For example, the hardware configuration may involve manually moving a switch on the relay-UE 30 to a first position so as to indicate to the relay-UE 30 that it is positioned indoors and/or may involve manually moving the switch to a second position so as to indicate to the relay-UE 30 that it is positioned outdoors.

Moreover, in this implementation, the message may indicate in one of various ways whether the relay-UE 30 is positioned indoors or whether the relay-UE 30 is positioned outdoors. For example, the message may include a flag (e.g., a Boolean variable) indicating whether the relay-UE 30 is positioned indoors or whether the relay-UE 30 is positioned outdoors. In practice, the relay-UE 30 could set that flag based on the above-described information with which the relay-UE 30 is provisioned.

Accordingly, the base station 12 may receive a message including such an indication and may then use the indication as basis for making the determination of whether the relay-UE 30 is positioned indoors or whether the relay-UE 30 is positioned outdoors. In particular, if the message indicates that the relay-UE 30 is positioned indoors, then the base station 12 may determine that the relay-UE 30 is positioned indoors based on that indication. But if the message indicates that the relay-UE 30 is positioned outdoors, then the base station 12 may determine that the relay-UE 30 is positioned outdoors based on that indication.

In another implementation, the received message may specify an altitude of the relay-UE 30 and the specified altitude may serve as the indication of whether the relay-UE 30 is positioned indoors or whether the relay-UE 30 is positioned outdoors. As an initial matter, the relay-UE 30 may determine its altitude in various ways, such based on altitude data from an altimeter that is coupled to the relay-UE 30 and/or based on altitude data received from a Global Positioning System (GPS), among other options. Once determined, the relay-UE 30 may specify the determined altitude in the message, so as to provide an indication of whether the relay-UE 30 is positioned indoors or outdoors.

Generally, the manner in which relay-UEs are typically deployed throughout a network may allow for use of a relay-UE's altitude as an indication of whether a relay-UE is positioned indoors or whether a relay-UE is positioned outdoors. In particular, a relay-UE may be located in one of various terrestrial locations each having a different type of infrastructure and/or a different type of landscape, among other possibilities. In most terrestrial locations (e.g., suburban/rural locations) with the exception of urban locations having high-rise buildings, relay-UEs positioned indoors (e.g., in a building) are typically at lower altitudes than relay-UEs positioned outdoors (e.g., mounted on an outdoor pole). But in urban environment, relay-UEs positioned indoors (e.g., in a high-rise building) are typically at higher altitudes than relay-UEs positioned outdoors (e.g., mounted on an outdoor pole).

In this implementation, as noted, the base station 12 may use the specified altitude of the relay-UE 30 as basis for making the determination of whether the relay-UE 30 is positioned indoors or whether the relay-UE 30 is positioned outdoors. Although a relay-UE's altitude often reflects the relay-UE's indoor vs. outdoor nature, the base station 12 may make the determination based on the specified altitude, even though the relay-UE 30's altitude may not necessarily accurately reflect the relay-UE 30's indoor vs. outdoor nature. For this reason, in this implementation, the base station 12 may effectively end up allocating air interface resources to the relay-UE 30 based on the specified altitude. Nonetheless, the base station 12 may use the relay-UE 30's altitude in various ways as basis for making the determination.

In one case, the base station 12 may use the relay-UE 30's altitude as basis for making the determination and may do so without consideration of the relay-UE 30's terrestrial location. In particular, given that that in most terrestrial locations relay-UEs positioned indoors are typically at lower altitudes than relay-UEs positioned outdoors, the base station 12 may be configured to make the determination based on whether the relay-UE 30's altitude is above or below a threshold altitude (e.g., the threshold altitude may be established via manual engineering input). In this case, if the base station 12 determines that the relay-UE 30's altitude is higher than the threshold altitude, then the base station 12 may responsively determine that the relay-UE 30 is positioned outdoors. But if the base station 12 determines that the relay-UE 30's altitude is lower than the threshold altitude, then the base station 12 may responsively determine that the relay-UE 30 is positioned indoors.

In another case, the base station 12 may use the relay-UE 30's altitude as basis for making the determination and may do so with consideration of the relay-UE 30's terrestrial location. In particular, the base station 12 may determine the relay-UE 30's terrestrial location and may then use both the relay-UE 30's terrestrial location and the relay-UE 30's altitude as basis for making the determination.

As an initial matter, the base station 12 may determine the relay-UE 30's terrestrial location in various ways, such as by querying a location determination platform (not shown) of the wireless communication system and/or in other ways. For example, the base station 12 may receive from the location determination platform information related to the relay-UE 30's terrestrial location, and the base station 12 may use such information as basis for determining whether the relay-UE 30 is in a suburban/rural location or in an urban location. For instance, the received information may be the relay-UE 30's latitude and longitude coordinate points, and the base station 12 may determine the relay-UE 30's terrestrial location based on these coordinate points. To do so, the base station 12 may refer to mapping data that maps each of a plurality of coordinate points respectively with an indication of the terrestrial location (e.g., a suburban/rural location or an urban location). Other examples are also possible After the base station 12 has determined both the relay-UE 30's altitude and the relay-UE 30's terrestrial location, the base station 12 may then use such information to make the determination of whether the relay-UE 30 is indoors or outdoors. In particular, if the base station 12 determines that the relay-UE 30's is in a suburban/rural location and that the relay-UE 30's altitude is higher than the above-mentioned threshold altitude, the base station 12 may responsively determine that the relay-UE 30 is positioned outdoors. But if the base station 12 determines that the relay-UE 30's is in a suburban/rural location and that the relay-UE 30's altitude is lower than the above-mentioned threshold altitude, the base station 12 may responsively determine that the relay-UE 30 is positioned indoors. Further, if the base station 12 determines that the relay-UE 30 is in an urban location and that the relay-UE 30's altitude is higher than a threshold altitude (e.g., same as or different from the above-mentioned threshold altitude), then the base station 12 may responsively determine that the relay-UE 30 is positioned indoors. But if the base station 12 determines that the relay-UE 30 is in an urban location and that the relay-UE 30's altitude is lower than the threshold altitude, then the base station 12 may responsively determine that the relay-UE 30 is positioned outdoors. Other cases and implementations are also possible.

Once the base station 12 makes the determination, the base station 12 may then responsively allocate of air interface resources to the relay-UE 30 based on the determination. As noted, assuming all other factors are the same, the base station 12 can ensure that the relay-UE 30 receives more air interface resources if it is positioned indoors than it receives if it is positioned outdoors. In accordance with the disclosure, such allocation of additional air interface resources to an indoor relay-UE may take various forms.

In one case, the base station 12 may provide to the relay-UE 30 a quantity of air interface resources that is based on a determination that the relay-UE 30 is positioned indoors. Specifically, the base station 12 may provide to the relay-UE 30 a first quantity of air interface resources before the determination is made. And once the base station 12 makes the determination that the relay-UE 30 is positioned indoors, the base station 12 may provide to the relay-UE 30 a second quantity of air interface resources that is larger than the first quantity. In practice, the act of providing the relay-UE 30 with a larger quantity of air interface resources may take various forms.

In one example, providing the larger second quantity of air interface resources may involve providing at least a threshold quantity of air interface resources (e.g., a threshold number resource units) per unit time, such as per TTI. Generally, the threshold quantity may be one that helps compensate for issues that could arise as a result of a relay-UE being indoors. In this example, if the base station 12 is already providing at least the threshold quantity of resources per unit time to the relay-UE 30, then the base station 12 may continue to do so while the relay-UE 30 is indoors. But if the base station 12 is not already providing at least the threshold quantity of resources per unit time to the relay-UE 30, then the base station 12 may allocate additional resources to the relay-UE 30 so as to provide at least the threshold quantity of resources per unit time to the relay-UE 30 while the relay-UE 30 is indoors.

In another example, the base station 12 may determine an increase in the quantity of air interface resources, and may then increase the quantity of air interface resources being provided to the relay-UE 30 by the determined increase. For instance, based on the determination that the relay-UE 30 is indoors, the base station 12 may determine that the quantity of air interface resource (e.g., the number of resource units) per unit time being provided to the relay-UE 30 is to be increased by a particular quantity or by a particular percentage, among other options. And the base station 12 may then responsively increase the quantity of resources per unit time accordingly. In this way, the base station 12 may increase the quantity of resources per unit time being provided to the relay-UE 30 from a first quantity to a second quantity that is larger than the first quantity. Other examples are also possible.

In another case, the base station 12 may assign to the relay-UE 30 a scheduling priority level that is based on a determination that the relay-UE 30 is positioned within an indoor environment. Specifically, the base station 12 may assign to the relay-UE 30 a first scheduling priority level before the determination is made. And once the base station 12 makes the determination that the relay-UE 30 is positioned within an indoor environment, the base station 12 may assign to the relay-UE 30 a second scheduling priority level that is higher than the first scheduling priority level. In practice, the act of assigning a higher scheduling priority level may take various forms.

In one example, assigning the higher second scheduling priority level may involve assigning at least a threshold scheduling priority level to the relay-UE 30, such as by assigning at least a threshold scheduling weight to the relay-UE 30. In practice, this threshold scheduling weight may be one that helps compensate for issues that could arise as a result of a relay-UE being indoors. For instance, this threshold scheduling weight may be the above-mentioned scheduling weight of 1:2. In this example, if the base station 12 has already assigned to the relay-UE 30 a scheduling weight that is at or higher than the threshold scheduling weight, then the base station 12 may maintain, while the relay-UE 30 is indoors, a scheduling weight that is at or higher than the threshold scheduling weight. But if the base station 12 has not already assigned at least the threshold scheduling weight to the relay-UE 30, then the base station 12 may assign at least the threshold scheduling weight to the relay-UE 30 and may maintain, while the relay-UE 30 is indoors, a scheduling weight that is at or higher than the threshold scheduling weight.

In another example, the base station 12 may determine an increase in the scheduling priority level assigned to the relay-UE 30, and may then increase the scheduling priority level by the determined increase. For instance, based on the determination that the relay-UE 30 is indoors, the base station 12 may determine that the scheduling weight assigned to the relay-UE 30 is to be increased by a particular extent. And the base station 12 may then responsively increase the scheduling weight accordingly. In a specific example, the base station 12 may determine the scheduling weight is to be doubled and thus may increase the scheduling weight from a scheduling weight of 1:4 to a scheduling weight of 1:2. Other examples are also possible.

Figure 4:
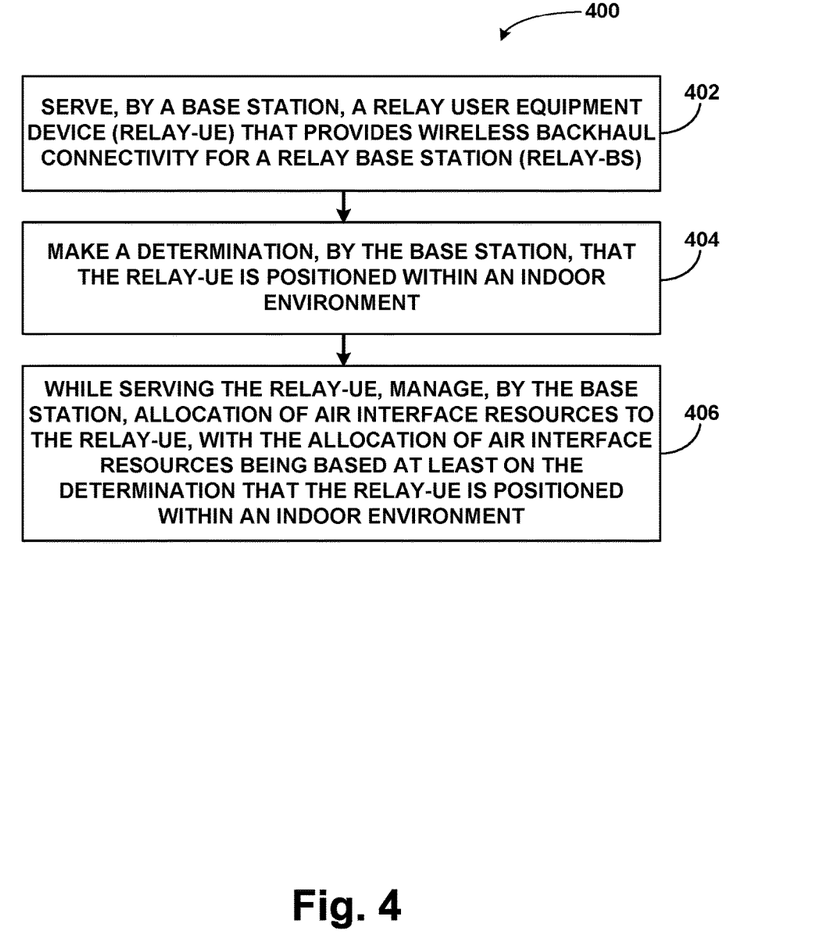
FIG. 4 is a flow chart depicting example operations in accordance with the present disclosure.

FIG. 4 is next a flow chart illustrating a method 400 according to an example embodiment. Illustrative methods, such as method 400, may be carried out in whole or in part by component(s) and/or arrangement(s) in a wireless communication system, such as with one or more of the components of the example communication system shown in FIG. 1 and/or with one or more of the components of the example base station shown in FIG. 6 and further discussed below, among other possibilities. However, it should be understood that example methods, such as method 400, may be carried out by other entities or combinations of entities as well as in other arrangements, without departing from the scope of the disclosure.

As shown by block 402 in FIG. 4, method 400 involves a base station serving a relay-UE that provides wireless backhaul connectivity for a relay-BS. Additionally, at block 404, method 400 involves the base station making a determination that the relay-UE is positioned within an indoor environment. Further, at block 406, method 400 involves, while serving the relay-UE, the base station managing allocation of air interface resources to the relay-UE, with the allocation of air interface resources being based at least on the determination that the relay-UE is positioned within an indoor environment.

Figure 5:
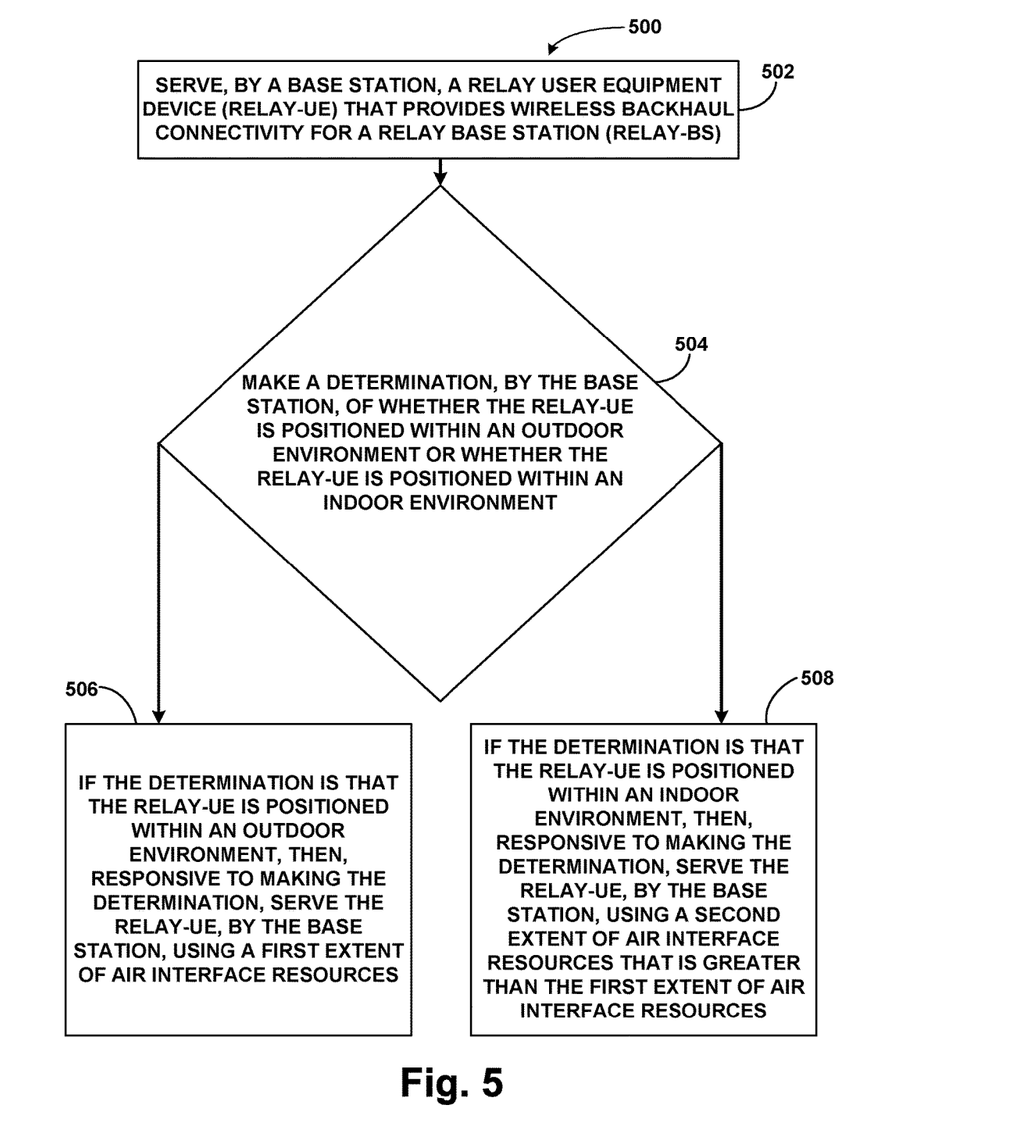
FIG. 5 is another flow chart depicting example operations in accordance with the present disclosure.

FIG. 5 is next a flow chart illustrating a method 500 according to an example embodiment. As shown by block 502 in FIG. 5, method 500 involves a base station serving a relay-UE that provides wireless backhaul connectivity for a relay-BS. Additionally, at block 504, method 500 involves the base station making a determination of whether the relay-UE is positioned within an outdoor environment or whether the relay-UE is positioned within an indoor environment. Further, at block 506, method 500 involves, if the determination is that the relay-UE is positioned within an outdoor environment, then, responsive to making the determination, the base station serving the relay-UE using a first extent of air interface resources. Yet further, at block 508, method 500 involves, if the determination is that the relay-UE is positioned within an indoor environment, then, responsive to making the determination, the base station serving the relay-UE using a second extent of air interface resources that is greater than the first extent of air interface resources.

Figure 6:
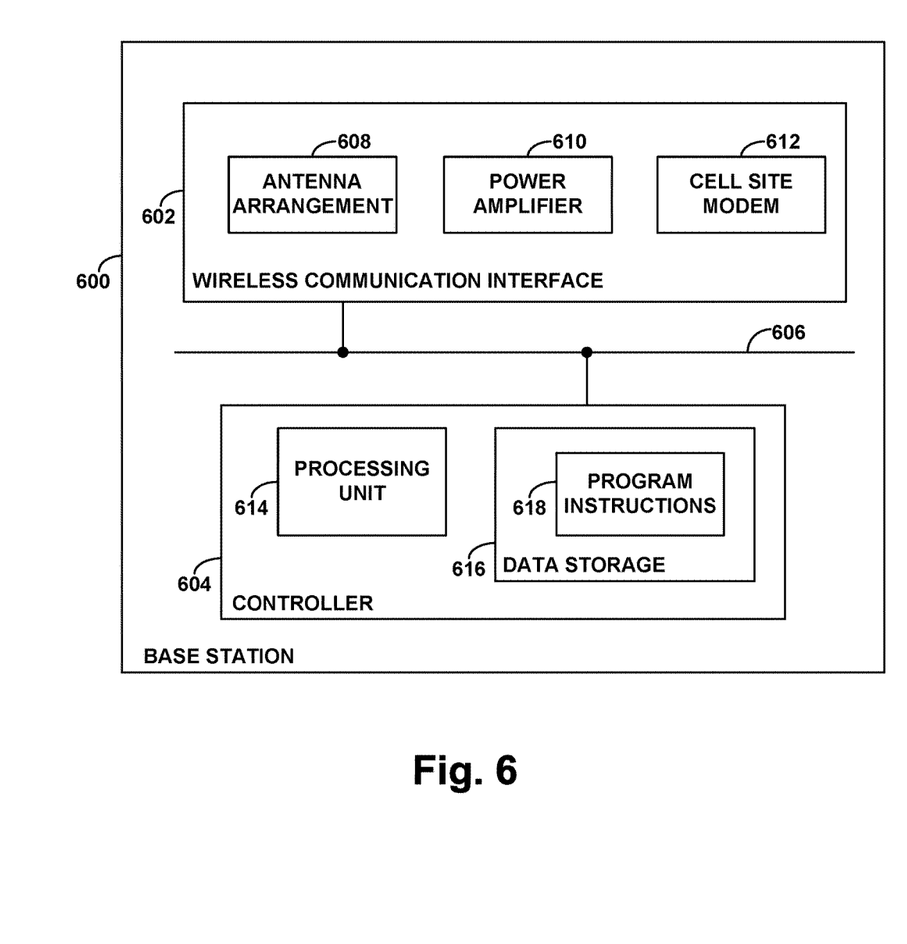
FIG. 6 is a simplified block diagram of an example base station operable in accordance with the present disclosure.

FIG. 6 is next a simplified block diagram of a representative base station 600 such as base station 12, illustrating some of the components that can be included in such an entity. As shown in FIG. 6, the representative base station 600 may include a wireless communication interface 602 and a controller 604. Additionally, these components of the base station 600 may be communicatively linked together by a system bus, network, or other connection mechanism 606. Alternatively, they may be integrated together in various ways.

As shown, wireless communication interface 602 may include an antenna arrangement 608, which may be tower mounted, and associated components such as a power amplifier 610 and a cell site modem 612 for engaging in air interface communication with UEs via the antenna arrangement 608, so as to transmit data and control information to the UEs and receive data and control information from the UEs. Additionally, controller 604 may include processing unit 614 and data storage 616 and is arranged to manage or carry out various functions such as those discussed herein.

Processing unit 614 may then comprise one or more general purpose processors (e.g., microprocessors) and/or special-purpose processors (e.g., digital signal processors and/or application specific integrated circuits) and may be integrated in whole or in part with the wireless communication interface 602. And data storage 616 may include one or more volatile and/or non-volatile storage components, such as magnetic, optical, flash, or other types of non-transitory computer readable media, and may be integrated in whole or in part with processing unit 614.

As shown, data storage 616 may hold (e.g., have encoded thereon) program instructions 618, which may be executable by processing unit 614 to carry out various controller functions. As such, the processing unit 614 programmed with instructions 618 may define part or all of a controller for controlling operation of the base station 600. Alternatively or additionally, however, such control functionality could be provided external to the base station 600, in another entity (e.g., separate from the base station 600) such as by a base station control entity (e.g., a Mobility Management Entity (MME)), which may be communicatively linked with the base station 600 and may serve to control certain aspects of base station operation generally.

Figure 7:
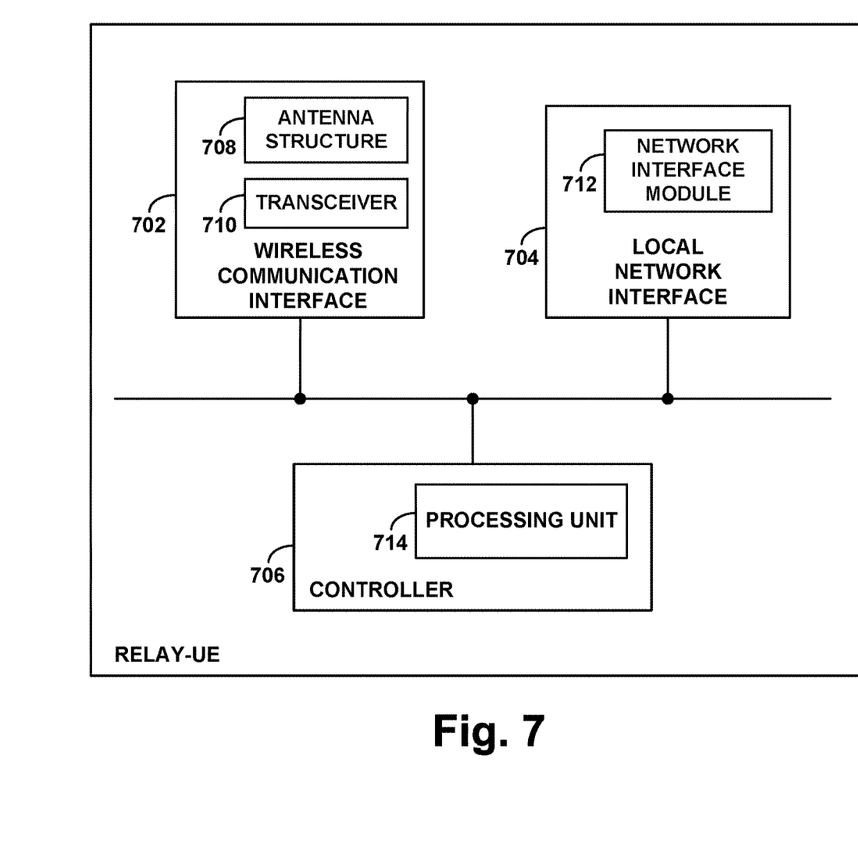
FIG. 7 is a simplified block diagram of an example relay-UE operable in accordance with the present disclosure.

Finally, FIG. 7 is a simplified block diagram of a relay-UE, showing some of the components that such an entity could include. As shown, the relay-UE includes a wireless communication interface 702, a local network interface 704, and a controller 706, any or all of which could be integrated together in various ways. In particular, the wireless communication interface 702 could include an antenna structure 708 and transceiver 710, for communicating over the air interface with a donor base station. The local network interface 704 could include a network interface module (e.g., Ethernet module) 712 for communicating with a relay-BS. And the controller 706 could include a processing unit 714 (e.g., one or more microprocessors or the like) programmed with instructions to carry out various relay-UE operations, such as those described herein.

Exemplary embodiments have been described above. It should be understood, however, that variations from these embodiments are possible, while remaining within the true spirit and scope of the invention.

We claim:

1. A non-transitory computer readable medium having stored thereon instructions executable by a processor to cause a base station to perform operations comprising:
    serving a relay user equipment device (relay-UE) that provides wireless backhaul connectivity for a relay base station (relay-BS);
    making a determination of whether the relay-UE is positioned within an outdoor environment or whether the relay-UE is positioned within an indoor environment;
    if the determination is that the relay-UE is positioned within an outdoor environment, then, responsive to making the determination, serving the relay-UE using a first extent of air interface resources; and
    if the determination is that the relay-UE is positioned within an indoor environment, then, responsive to making the determination, serving the relay-UE using a second extent of air interface resources that is greater than the first extent of air interface resources.

2. The non-transitory computer readable medium of claim 1, wherein the operations further comprise:
    receiving, from the relay-UE, a message indicative of whether the relay-UE is positioned within an outdoor environment or whether the relay-UE is positioned within an indoor environment, wherein making the determination is based at least on the received message.

3. The non-transitory computer readable medium of claim 2,
    wherein the received message being indicative of whether the relay-UE is positioned within an outdoor environment or whether the relay-UE is positioned within an indoor environment comprises the received message specifying an altitude of the relay-UE, and
    wherein making the determination based at least on the received message comprises making the determination based at least on the specified altitude of the relay-UE.

4. The non-transitory computer readable medium of claim 3, wherein making the determination based on the specified altitude of the relay-UE comprises:
    determining whether the specified altitude of the relay-UE is threshold low; and
    based on the determining of whether the specified altitude of the relay-UE is threshold low, determining whether the relay-UE is positioned within an outdoor environment or whether the relay-UE is positioned within an indoor environment.

5. The non-transitory computer readable medium of claim 3, wherein the operations further comprise:
determining a terrestrial location of the relay-UE,
wherein making the determination of whether the relay-UE is positioned within an outdoor environment or whether the relay-UE is positioned within an indoor environment further comprises making the determination based at least on both the specified altitude of the relay-UE and the determined terrestrial location of the relay-UE.

6. The non-transitory computer readable medium of claim 1,
wherein serving the relay-UE using the first extent of air interface resources comprises assigning to the relay-UE a first scheduling priority level, wherein the first scheduling priority level defines a first priority with which the base station uses air interface resources to transmit data between the base station and the relay-UE,
wherein serving the relay-UE using the second extent of air interface resources comprises assigning to the relay-UE a second scheduling priority level, wherein the second scheduling priority level defines a second priority with which the base station uses air interface resources to transmit data between the base station and the relay-UE, and wherein the second priority is higher than the first priority.

7. The non-transitory computer readable medium of claim 1,
wherein serving the relay-UE using the second extent of air interface resources comprises assigning to the relay-UE a scheduling priority level that is higher than a threshold scheduling priority level.

8. The non-transitory computer readable medium of claim 1,
wherein a scheduling priority level is assigned to the relay-UE, and
wherein serving the relay-UE using the second extent of air interface resources comprises, (i) based at least on the determination that the relay-UE is positioned within an indoor environment, determining an increase in the scheduling priority level, and (ii) increasing, for the relay-UE, the scheduling priority level by the determined increase.

9. The non-transitory computer readable medium of claim 1, wherein the operations further comprise:
before making the determination, assigning a first scheduling priority level to the relay-UE,
wherein serving the relay-UE using the second extent of air interface resources comprises assigning to the relay-UE a second scheduling priority level that is higher than the first scheduling priority level.

10. The non-transitory computer readable medium of claim 1,
wherein serving the relay-UE using the first extent of air interface resources comprises providing to the relay-UE a first quantity of air interface resources per unit time, and
wherein serving the relay-UE using the second extent of air interface resources comprises providing to the relay-UE a second quantity of air interface resources per unit time that is greater than the first quantity of air interface resources.

11. The non-transitory computer readable medium of claim 1,
wherein serving the relay-UE using the second extent of air interface resources comprises providing to the relay-UE a quantity of air interface resources per unit time that is greater than a threshold quantity of air interface resources.

12. The non-transitory computer readable medium of claim 1,
wherein a quantity of air interface resource is provided to the relay-UE, and
wherein serving the relay-UE using the second extent of air interface resources comprises, (i) based at least on the determination that the relay-UE is positioned within an indoor environment, determining an increase in the quantity of air interface resources, and (ii) increasing, for the relay-UE, the quantity of air interface resources by the determined increase.

13. The non-transitory computer readable medium of claim 1, wherein the operations further comprise:
before making the determination, providing to the relay-UE a first quantity of air interface resources,
wherein serving the relay-UE using the second extent of air interface resources comprises providing to the relay-UE a second quantity of air interface resources that is greater than the first quantity of air interface resources.

14. A base station comprising:
an antenna structure configured to provide an air interface through which the base station serves one or more user equipment devices (UEs); and
a controller configured to cause the base station to carry out operations including:
serving a relay-UE over the air interface, wherein the relay-UE provides wireless backhaul connectivity for a relay base station (relay-BS);
making a determination of whether the relay-UE is positioned within an outdoor environment or whether the relay-UE is positioned within an indoor environment;
if the determination is that the relay-UE is positioned within an outdoor environment, then, responsive to making the determination, serving the relay-UE using a first extent of air interface resources; and
if the determination is that the relay-UE is positioned within an indoor environment, then, responsive to making the determination, serving the relay-UE using a second extent of air interface resources that is greater than the first extent of air interface resources.

15. The base station of claim 14,
wherein serving the relay-UE using the first extent of air interface resources comprises assigning to the relay-UE a first scheduling priority level, wherein the first scheduling priority level defines a first priority with which the base station uses air interface resources to transmit data between the base station and the relay-UE,
wherein serving the relay-UE using the second extent of air interface resources comprises assigning to the relay-UE a second scheduling priority level, wherein the second scheduling priority level defines a second priority with which the base station uses air interface resources to transmit data between the base station and the relay-UE, and wherein the second priority is higher than the first priority.

16. The base station of claim 14,
wherein serving the relay-UE using the first extent of air interface resources comprises providing to the relay-UE a first quantity of air interface per unit time, and wherein serving the relay-UE using the second extent of air interface resources comprises providing to the relay-UE a second quantity of air interface resources per unit time that is greater than the first quantity of air interface resources.

17. A method comprising:
serving, by a base station, a relay user equipment device (relay-UE) that provides wireless backhaul connectivity for a relay base station (relay-BS);
making a determination, by the base station, of whether the relay-UE is positioned within an outdoor environment or whether the relay-UE is positioned within an indoor environment;
if the determination is that the relay-UE is positioned within an outdoor environment, then, responsive to making the determination, serving the relay-UE, by the base station, using a first extent of air interface resources; and
if the determination is that the relay-UE is positioned within an indoor environment, then, responsive to making the determination, serving the relay-UE, by the base station, using a second extent of air interface resources that is greater than the first extent of air interface resources.

18. The method of claim 17, further comprising:
receiving, by the base station from the relay-UE, a message indicative of whether the relay-UE is positioned within an outdoor environment or whether the relay-UE is positioned within an indoor environment, wherein the received message being indicative whether the relay-UE is positioned within an outdoor environment or whether the relay-UE is positioned within an indoor environment comprises the received message specifying an altitude of the relay-UE, and wherein making the determination comprises making the determination based at least on the specified altitude of the relay-UE.

19. The method of claim 17,
wherein serving the relay-UE using the first extent of air interface resources comprises assigning to the relay-UE a first scheduling priority level, wherein the first scheduling priority level defines a first priority with which the base station uses air interface resources to transmit data between the base station and the relay-UE,
wherein serving the relay-UE using the second extent of air interface resources comprises assigning to the relay-UE a second scheduling priority level, wherein the second scheduling priority level defines a second priority with which the base station uses air interface resources to transmit data between the base station and the relay-UE, and wherein the second priority is higher than the first priority.

20. The method of claim 17,
wherein serving the relay-UE using the first extent of air interface resources comprises providing to the relay-UE a first quantity of air interface per unit time, and
wherein serving the relay-UE using the second extent of air interface resources comprises providing to the relay-UE a second quantity of air interface resources per unit time that is greater than the first quantity of air interface resources.

* * * * *